F. KRATZ.
ELECTRICAL CONDENSER FOR IGNITION CURRENT GENERATORS.
APPLICATION FILED JAN. 30, 1914.

1,221,998.

Patented Apr. 10, 1917.

WITNESSES
L. Bates
C. B. Schroeder

INVENTOR
Franz Kratz
By
Pennie Davis & Glascough
Attys.

ated Apr. 10, 1917.

UNITED STATES PATENT OFFICE.

FRANZ KRATZ, OF STUTTGART, GERMANY, ASSIGNOR TO THE FIRM OF ROBERT BOSCH, OF STUTTGART, GERMANY.

ELECTRICAL CONDENSER FOR IGNITION-CURRENT GENERATORS.

1,221,998. Specification of Letters Patent. Patented Apr. 10, 1917.

Application filed January 30, 1914. Serial No. 815,478.

*To all whom it may concern:*

Be it known that I, FRANZ KRATZ, a subject of the Emperor of Germany, residing at Stuttgart, Germany, have invented certain new and useful Improvements in Electrical Condensers for Ignition-Current Generators; and I do hereby declare the following to be a full, clear, and exact description of the invention, such as will enable others skilled in the art to which it appertains to make and use the same.

The object of the present invention is to provide means for nicely associating in an ignition current generator, such as a magneto, a coil condenser preferably of oval shape, having its two conductive bands individually projecting on the two lateral sides of the condenser.

Figure 1:
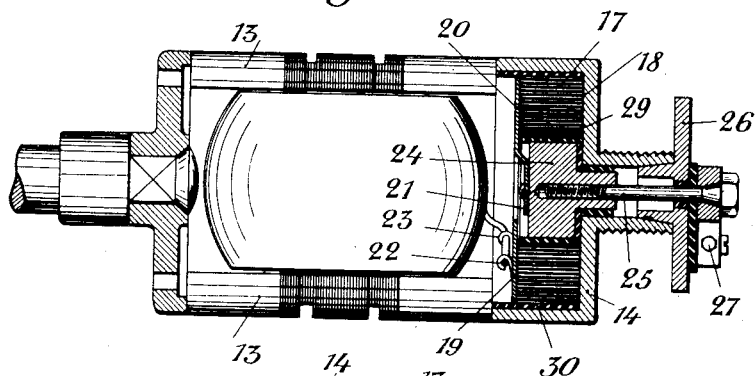
Figure 2:
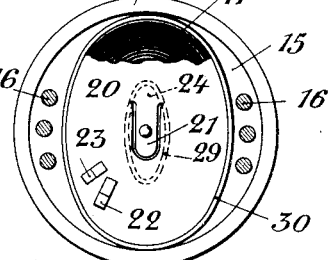
Figure 3:
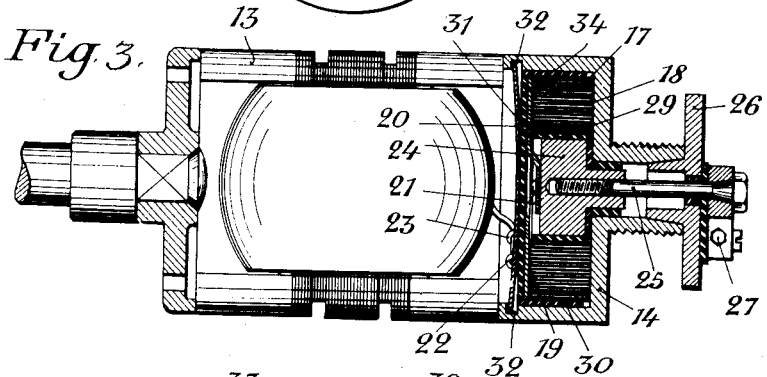
Figure 4:
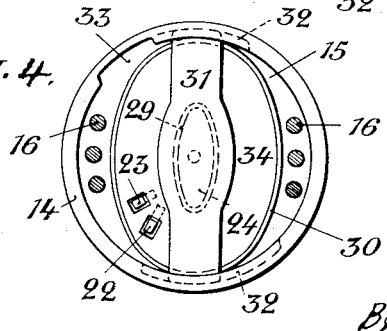

In the accompanying drawings illustrating several embodiments within the invention, Figure 1 represents a longitudinal view, partly in section, of the armature of an ignition current generator in which the condenser is incorporated; Fig. 2 represents a side elevation, partly broken away, of the condenser mounted in the armature cover; Fig. 3 represents a longitudinal view, partly in section, of an ignition current generator in which the condenser is incorporated in a slightly modified way; and Fig. 4 represents a view, similar to Fig. 2, of the arrangement shown in Fig. 3.

In Figs. 1 and 2, the armature cover 14 is fastened to the armature core 13 by means of the screws 16. The cover has an internal recess 15 of circular outline appropriate to the condenser 17, and the wall of the cover is made thicker at the places of the fastening screws 16. In this way, the cover 14 is held firmly in place against the end of the armature core.

The side 18 of the condenser is pressed against the internal wall of the cover 14, so that one electrode of the condenser, formed by the conductor band individually projecting on that side, is grounded on the frame of the generator. The insulation 30 extends around the inner periphery of the cover and insulates the remaining parts of the condenser from the cover.

The metal plate 20 is forced against the side 19 of the condenser so as to make contact with the side edges of the other conductive band, and this plate is insulated from the cover by the insulation 30 to thereby form the insulated terminal of the condenser. This plate 20 serves to hold the condenser reliably in place with its side 18 against the cover.

The eyes 22 and 23 are fastened on the plate 20 and provide a connection for the insulated end of the armature winding, as shown in Fig. 1. The nut 24 is of oval shape and is fitted within the insulated core 29 of the condenser. A spring tongue 21 is stamped out of the middle of the metal plate and is riveted to the nut 24. In this way, a flexible and secure connection is provided between the plate 20 and the nut 24, while the plate is reliably connected to one electrode of the condenser and to the insulated end of the armature winding. The bolt 25 electrically connects the insulated contact 27 of the mechanical interrupter with the nut 24, so that the condenser is connected across the contacts of the interrupter and the insulated terminal of the armature winding is connected to the insulated terminal of the interrupter. At the same time the interrupter and the condenser are held securely in place.

Figs. 3 and 4 show an arrangement for facilitating the assembly and disconnection of the mechanical interrupter. The internal peripheral wall of the cover 14 is provided with grooves 32, one of which terminates in a cutout portion 33 alongside of the longer diameter of the condenser. The leaf spring 31 is inserted in place against the insulated plate 34 by inserting its ends in the peripheral grooves 32. This spring exerts a requisite amount of pressure against the metal plate 20 to hold the condenser securely in place with its side 18 against the internal wall of the cover. The remaining features of the arrangement are similar to those previously described in connection with Figs. 1 and 2, the insulated end of the armature winding being connected to the insulated metal plate 20, and the oval nut 24 being connected to this plate by the tongue 21 and to the insulated contact 27 of the mechanical interrupter by means of the bolt 25.

The arrangement shown in Figs. 3 and 4 materially facilitates the insertion of the bolt 25. If, for example, the bolt does not immediately engage the internal threads of the nut, the condenser may be pressed out of its position, and the connection between the armature winding and the plate 20 thereby torn off. Furthermore, the contact between the side 18 of the condenser and the inner wall of the cover would be unreliable. However, in the construction shown, the condenser is held fast in place by the spring 31, so that the bolt 25 engages the nut 24 with no possibility of mishap.

Having thus described my invention, what I claim is:

1. The combination with an ignition current generator, of a condenser having two electrodes insulated from each other and projecting individually on the two lateral sides of the condenser, and electrical conducting members positioned on opposite sides of the condenser and having flat surfaces engaging the oppositely projecting electrodes thereof.

2. The combination with an ignition current generator, of a condenser having two electrodes insulated from each other and projecting individually on the two lateral sides of the condenser, the outer and inner surfaces of the condenser being of oval form, and electrical conducting members positioned on opposite sides of the condenser and having flat surfaces engaging the oppositely projecting electrodes thereof.

3. The combination with an ignition current generator having a cover with an internal recess, and a condenser mounted in said recess and having two electrodes insulated from each other and projecting individually on the two lateral sides of the condenser, of an insulated plate in contact with the electrode of the condenser which projects on one side thereof, a nut within the core of the condenser elastically connected to said plate, an insulated interrupter contact, and a bolt passing through said contact and engaging said nut whereby said plate will be pressed against the condenser to force the electrode projecting on the other side thereof into electrical contact with the wall of said recess.

4. The combination with an ignition current generator having a cover with an internal recess, and a condenser mounted in said recess and having two electrodes insulated from each other and projecting individually on the two lateral sides of the condenser, of an insulated plate in contact with the electrode of the condenser which projects on one side thereof, a nut within the core of the condenser, said plate having an elastic tongue which is secured to said nut, an insulated interrupter contact, and a bolt passing through said contact and engaging said nut whereby said plate will be pressed against the condenser to force the electrode projecting on the other side thereof into electrical contact with the wall of said recess.

5. The combination with an ignition current generator having a cover with an internal recess, and a condenser mounted in said recess and having two electrodes insulated from each other and projecting individually on the two lateral sides of the condenser, of an insulated plate in contact with the electrodes of the condenser which projects on one side, and a spring plate insulated from the insulated plate and designed to press the insulated plate into contact with the condenser so as to force the other electrode of the condenser into contact with the wall of said recess, said spring plate being connected to the cover by a bayonet joint; substantially as described.

6. The combination with an ignition current generator having a cover with an internal recess, and a condenser mounted in said recess and having two electrodes insulated from each other and projecting individually on the two lateral sides of the condenser, of an insulated plate pressed into electrical contact with the electrode projecting on one side of the condenser to thereby force the electrode projecting on the other side of the condenser into electrical contact with the wall of said recess; substantially as described.

7. The combination with an ignition current generator having a cover with an internal recess, and a coil condenser mounted in said recess and having the conductive bands forming the two electrodes thereof projecting individually on the two lateral sides of the condenser, of an insulated plate pressed into electrical contact with the edge of the conductive band on one side of the condenser to thereby force the edge of the other conductive band on the other side of the condenser into electrical contact with the wall of said recess; substantially as described.

8. The combination with an ignition current generator having a cover with an internal recess, a condenser mounted in said recess and having two electrodes insulated from each other and projecting individually on the two lateral sides of the condenser, and a mechanical interrupter, of an insulated plate pressed into electrical contact with the electrode projecting on one side of the condenser to thereby force the electrode projecting on the other side of the condenser into electrical contact with the wall of said recess, a nut fastened within the core of the condenser, and a bolt screwed into said nut and extending to the interrupter so as to hold the condenser and interrupter in place, said bolt being electrically connected to the insulated terminal of the interrupter; substantially as described.

9. The combination with an ignition current generator having a cover with an internal recess, and a condenser mounted in said recess and having two electrodes insulated from each other and projecting individually on the two lateral sides of the condenser, of an insulated plate pressed into electrical contact with the electrode projecting on one side of the condenser to thereby force the electrode projecting on the other side of the condenser into electrical contact with the wall of said recess, and a nut mounted within the core of the condenser, said insulated plate having a spring tongue fastened to the nut; substantially as described.

10. The combination with an ignition current generator having a cover with an internal recess, and a condenser mounted in said recess and having two electrodes insulated from each other and projecting individually on the two lateral sides of the condenser, of an insulated plate in contact with the electrode of the condenser which projects on one side, and a spring plate insulated from the insulated plate and designed to press the insulated plate into contact with the condenser so as to force the other electrode of the condenser into contact with the wall of said recess; substantially as described.

In testimony whereof I affix my signature in presence of two witnesses.

FRANZ KRATZ.

Witnesses:
PAUL WOLFAST,
HERMANN SCHNEIDER.